United States Patent

Golitz et al.

[15] 3,676,478
[45] July 11, 1972

[54] SILYL-SUBSTITUTED UREA DERIVATIVES

[72] Inventors: Hans Dietrich Golitz, Koeln-Stammheim; Eberhart Degener, Leverkusen; Gunter Oertel, Cologne-Flittard, all of Germany; Hans-Georg Schmelzer, New Martinsville, W. Va.; Walter Simmler, Odenthal-Schlinghofen, Germany

[73] Assignee: Farbenfabriken Bayer Aktiengesellschaft, Leverkusen, Germany

[22] Filed: Nov. 26, 1969

[21] Appl. No.: 880,430

[30] Foreign Application Priority Data

Dec. 4, 1968 Germany.....................P 18 12 562.7

[52] U.S. Cl.................260/448.2 N, 117/124 F, 117/123 C, 252/357, 260/46.5 E, 260/46.5 G, 260/46.5 Y, 260/448.8 R, 260/448.2 E, 260/498.2 B
[51] Int. Cl. ...........................................................C07f 7/18
[58] Field of Search..............260/448.8 R, 448.2 N, 448.2 E, 260/448.2 B

[56] References Cited

UNITED STATES PATENTS

| 3,172,874 | 3/1965 | Klebe............................260/448.2 N X |
| 3,208,971 | 9/1965 | Gilkey et al..................260/448.2 N X |
| 3,288,754 | 11/1966 | Green ..........................260/448.2 N X |
| 3,567,753 | 3/1971 | Delaval et al. ..................260/448.2 N |

OTHER PUBLICATIONS

Noller, " Chemistry of Organic Compounds," 3rd Ed., W. B. Saunders Company, Philadelphia (1965), pps. 337–338.

*Primary Examiner*—Tobias E. Levow
*Assistant Examiner*—P. F. Shaver
*Attorney*—Burgess, Dinklage & Sprung

[57] ABSTRACT

New organosilyl- and carbamate-modified urea derivatives have the formula

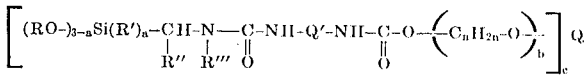

in which R and R' are monovalent hydrocarbon radicals, R" and R'" are hydrogen atoms or monovalent hydrocarbon radicals, Q' is a bivalent hydrocarbon radical, Q is a monovalent to hexavalent hydrocarbon radical, $a$ is 0, 1, 2 or 3, $n$ is 2, 3 or 4, $b$ is zero or an integer from 1 to 200, and $c$ is the valency number of Q.

These urea derivatives are prepared by reacting at a temperature of from $-20°$ to $150°$ C an aminoalkyl-silane derivative of the formula

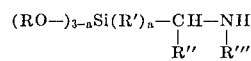

with an isocyanate-modified carbamic acid ester of the formula

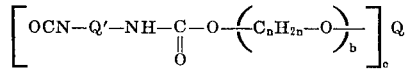

The products are to be used as priming agents imparting adhesion to synthetic resins on siliceous surfaces, as surfactants and as intermediates for organo-polysiloxane resins.

6 Claims, No Drawings

SILYL-SUBSTITUTED UREA DERIVATIVES

The present invention relates to certain new carbo-functional organosilanes. These compounds can be regarded as carbamate-modified urea derivatives having the general formula

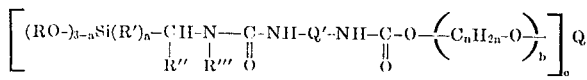

in which

R is an alkyl or cycloalkyl radical having up to six carbon atoms or a phenyl radical, R' is an optionally halo- or cyano-substituted alkyl, cycloalkyl or aryl radical having up to 10 carbon atoms, R'' is a hydrogen atom or a methyl or phenyl radical, R''' is a hydrogen atom or an optionally halo- or cyano-substituted alkyl, cycloalkyl or aryl radical having up to 10 carbon atoms, Q' is an alkylene radical with two to 10 carbon atoms, a cycloalkylene, arylalkylene, arylene or alkylarylene radical having up to 10 carbon atoms, or an arylene radical derived from diphenyl-methane by the removal of two hydrogen atoms, Q is a monovalent to hexavalent saturated aliphatic hydrocarbon radical having up to six carbon atoms, $a$ is 0, 1, 2 or 3, $n$ is 2, 3 or 4, $b$ is 0 or an integer from 1 to 200, $c$ is the valency number of Q.

The meaning of the symbols may of course vary within the ranges expressed above in each position of a molecule.

The invention also provides a process for the preparation of these compounds in which an aminoalkyl-silane derivative of the formula

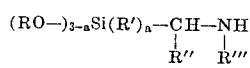

is reacted with an isocyanate-modified carbamic acid ester of the formula

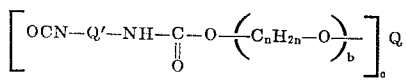

at a temperature of from −20° to 150° C, preferably 20° to 60° C, optionally in the presence of a diluent.

In general, this reaction is exothermic; if necessary, it may be moderated by cooling or, if it slows down, its completion may be accelerated by heating. Suitable diluents are inert solvents, such as cyclohexane or toluene, as well as alcoholic hydroxyl compounds, including those of high molecular weight, and mixtures of these types. The hydroxyl compounds can be used for diluting because, as is known, isocyanates react substantially faster with amines than with alcohols. If the diluent is a nonvolatile high molecular weight hydroxyl compound, in particular, for example, a polyalkylene glycol monoalkyl ether of the formula

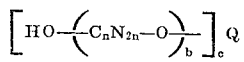

it is often of advantage to retain this polyether in the reaction product. If, on the other hand, a volatile solvent has been used for diluting, this is normally removed from the reaction product by distillation, in some cases advantageously in a thin layer evaporator.

The new products are suitable for use as intermediate layers imparting adhesion to siliceous surfaces which shall be coated with synthetic materials, as interface-active agents and as intermediates for the preparation of organo-polysiloxane resins. Their urea as well as their carbamate groupings impart to them a certain polarity and, in comparison with the non-functional organo-silicon compounds, give rise to a reduction of the sometimes disadvantageous solubility in non-polar solvents. Moreover, their viscosity is comparatively high by reason of the urea grouping, and this is desirable for some organo-polysiloxane resins.

The aminomethyl-silane derivatives used for the preparation of the new compounds may be obtained according to a known method by reacting a chloro- or bromo-methylsilane derivative of the formula

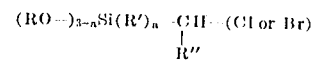

with an amine of the formula R'''NH$_2$ at a temperature of from 20° to 150° C, preferably 50° to 120° C. It is advantageous to choose primary amines with boiling points above 40° C, such as cyclohexylamine or isobutylamine, which are preferably used in a five- to 10-fold excess and may then serve as a component of the reaction product to be obtained and, at the same time, as acid-binder and diluent.

For example, the aminomethyl-silane derivatives used in the following Examples can be prepared as follows:

A. 394 g (2 mols) dimethyl-(bromomethyl)-ethoxy-silane are added with stirring to 992 g (10 mols) cyclohexylamine, whereupon the temperature rises to about 100° C. The reaction mixture is subsequently heated at boiling temperature under reflux for 2 hours, and the precipitated amine salt is filtered off after cooling. By fractional distillation of the filtrate there is obtained, at 18 mm Hg between 115° and 118° C, the N-cyclohexyl-(aminomethyl)-dimethyl-ethoxy-silane of the formula

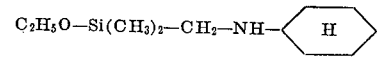

B. 356 g (3.6 mols) anhydrous cyclohexylamine are heated to 45° C and 136 g (0.6 mol) methyl-(bromomethyl)-diethoxy-silane are gradually added in such a manner that a temperature of between 60° and 70° C is maintained. The mixture is then heated at 100° C for a further hour and then filtered at room temperature. By fractional distillation of the filtrate there is obtained, at 14 mm Hg between 130° and 133° C, the N-cyclohexyl-(aminomethyl)-methyl-diethoxy-silane of the formula

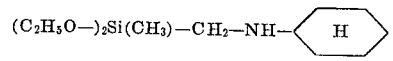

and of refractive index $n_D^{20} = 1.4460$.

C. 103.5 g (0.31 mols) α-bromobenzyl-triethoxy-silane which can be prepared in known manner by bromination of benzyl-trichloro-silane and subsequent ethanolysis are added dropwise at about 60° C to 136 g (1.86 mols) n-butylamine. The reaction mixture is then heated at boiling temperature under reflux for a further 3 hours and freed from the excess amine by reducing the pressure to 15 mm Hg and heating up to 80° C. The residue is dissolved in 100 ml anhydrous cyclohexane, the precipitated butyl ammonium bromide is filtered off, and by fractional distillation there is obtained, at 0.03 mm Hg between 100° and 105° C, the α-(butylamino)-benzyl-triethoxy-silane of the formula

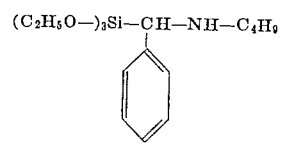

as a colorless liquid of refractive index $n_D^{20} = 1.4705$.

The isocyanate-modified carbamic acid esters are likewise obtained according to known processes by reacting diisocyanates, e.g., toluylene-diisocyanate-(2,4) or hexamethylene diisocyanate, with hydroxyl compounds of the formula

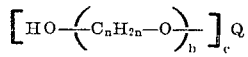

The diisocyanate is preferably used in a substantial excess so that the number of OCN groups in the initial reaction mixture amounts to two to six times the number of HO groups, and the diisocyanate remaining at the end of the reaction is removed by distillation, advantageously in a thin layer evaporator.

The isocyanate-modified carbamic acid esters used in the following Examples can be prepared in the following way:

1. 3,000 g of an anhydrous polyalkylene glycol monobutyl ether which has been prepared in known manner by alkoxylation of 1 mol n-butanol first with 17 mols ethylene oxide and then with 13 mols propylene oxide and the molecular weight of which amounts, on average, to 1,550 g, are mixed at 20° to 25° C with 1,740 g (10 mols) toluylene-diisocyanate-(2,4) and the mixture is heated at 70° C for 5 hours. The reaction product is then freed from the excess toluylene diisocyanate by thin layer distillation at 0.1 to 0.2 mmHg and 150° C; if necessary, this is repeated. As residue there is obtained, without substantial loss of yield, a pale yellow oil the structure of which corresponds to the formula

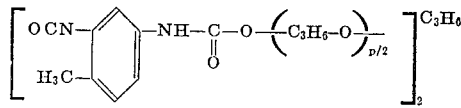

Its content of OCN groups amounts to 2.62 per cent by weight, its molecular weight accordingly to 1,605 g on average.

2. 1,000 g of a polypropylene glycol which has been prepared in known manner by alkoxylation of 1 mol 1,2-dihydroxy-propane with 28.4 mol propylene oxide and the molecular weight of which amounts, on average, to 2,000 g, are mixed with 522 g (3 mols) toluylene-diisocyanate-(2,4), and the mixture is heated at 70° C for 6 hours. The reaction mixture is then freed from the excess toluylene diisocyanate in a thin layer evaporator at 0.2 mm Hg and 150° C. The residue corresponds to the formula

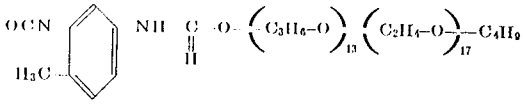

with $p$, on average, equal to 28.4. Its content of OCN groups amounts to 3.75 per cent by weight, its equivalent weight accordingly to 1,120 g.

3. 1,500 g of a polyalkylene glycol which has been prepared in known manner by alkoxylation of 1 mol 1,2-dihydroxy-propane first with 59.8 mol propylene oxide and then with 11.6 mol ethylene oxide and the molecular weight of which amounts to 4,000 g, are mixed at room temperature with 522 g (3 mols) toluylene-diisocyanate-(2,4), and the mixture is heated at 70° C for 6 hours. The reaction mixture is then freed from the excess toluylene diisocyanate in a thin layer evaporator at 0.1 to 0.2 mm Hg and 150° C. As residue there is obtained a clear pale yellow oil corresponding to the formula

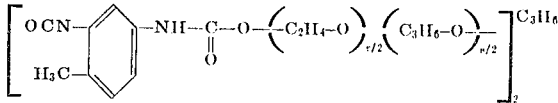

with $r$, on average, equal to 11.6 and $s$, on average, equal to 59.8. Its content of OCN groups amounts to 2.1 per cent by weight, its equivalent weight to 2000 g.

4. 1,000 g of a trihydroxy-polyether which has been prepared in known manner by alkoxylation of 1 mol 1,1,1-trimethylol-propane first with 7.5 mol ethylene oxide and then with 53 mol propylene oxide and the molecular weight of which amounts, on average, to 3,430 g, are mixed at room temperature with 348 g (2 mols) toluylene-diisocyanate-(2,4), and the mixture is heated at 70° C for 6 hours. The reaction product is then freed from the excess toluylene diisocyanate in a thin layer evaporator at 0.1 to 0.2 mm Hg and 150° C. As a residue there is obtained a pale yellow oil the structure of which corresponds to the formula

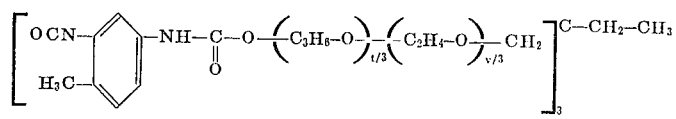

with $t$, on average, equal to 53 and $v$, on average, equal to 7.5. Its content of OCN groups amounts to 3.35 percent by weight, its equivalent weight accordingly to 1255 g.

5. 130 g (1 mol) 2-ethyl-hexanol are added dropwise with stirring at 80° to 90° C to 1008 g (6 mols) hexamethylene diisocyanate, and the mixture is kept at 80° C for a further 5 hours. It is then freed from the excess diisocyanate in a thin layer evaporator at 0.3 mm Hg and 150° C. There remains a clear pale yellow liquid of low viscosity, the structure of which corresponds to the formula

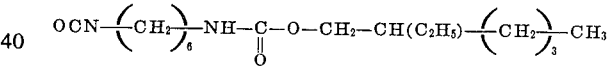

the content of OCN amounting to 15 percent by weight.

The following Examples are given for the purpose of illustrating the present invention.

EXAMPLE 1

161 g (0.1 mol) of an isocyanate-modified carbamic acid ester of the formula

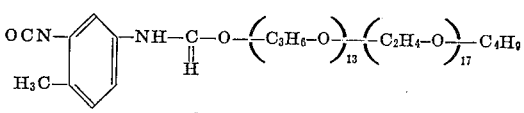

are mixed with 21.5 g (0.1 mol) N-cyclohexyl-(aminomethyl)-dimethyl-ethoxy-silane, and the mixture is stirred for 20 hours; the temperature temporarily rises to 45° C. The product present at the end of the reaction is a pale yellow, clear, viscous oil which is soluble in water and has a structure corresponding to the formula

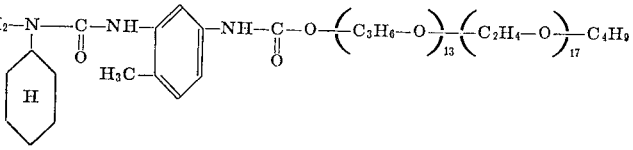

EXAMPLE 2

112 g (0.1 gram equivalent) of an isocyanate-modified carbamic acid ester as described above under (2) are mixed with 24.5 g (0.1 mol) N-cyclohexyl-(aminomethyl)-methyl-diethoxy-silane, and the mixture is stirred at room temperature, first under atmospheric pressure for one hour, then at 0.5 mm Hg for 30 minutes for degassing. The remaining product corresponds to the formula

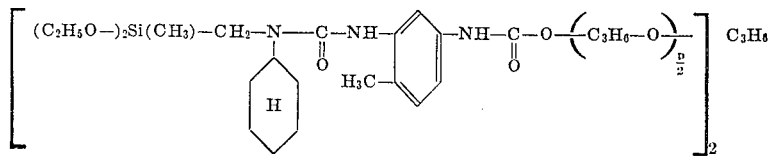

with $p$, on average, equal to 28.4.

EXAMPLE 3

200 g (0.1 gram equivalent) of an isocyanate-modified carbamic acid ester as described above under (3) are mixed with 32.5 g (0.1 mol) α-(n-butylamino)-benzyl-triethoxy-silane, and the mixture is stirred at room temperature first under atmospheric pressure for 1 hour, then at 0.5 mm Hg for another hour for degassing. There remains a clear, thinly liquid, pale-yellow oil, the structure of which corresponds to the formula

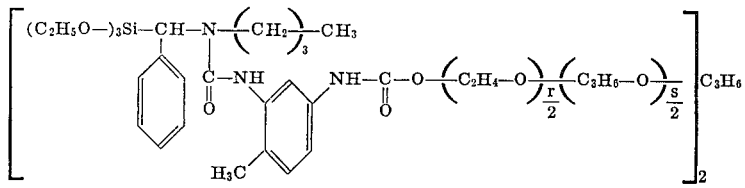

with $r$, on average, equal to 11.6 and $s$, on average, equal to 59.8.

EXAMPLE 4

253 g (0.2 gram equivalent) of an isocyanate-modified carbamic acid ester as described above under (4) are mixed with 43 g (0.2 mol) N-cyclohexyl-(aminomethyl)-dimethyl-ethoxy-silane, and the mixture is stirred for 3 hours; the temperature initially rises to about 40° C. The reaction mixture is then degassed at room temperature by reducing the pressure to 0.1 to 0.5 mm Hg for 1 hour. There remains a clear pale yellow oil the structure of which corresponds to the formula

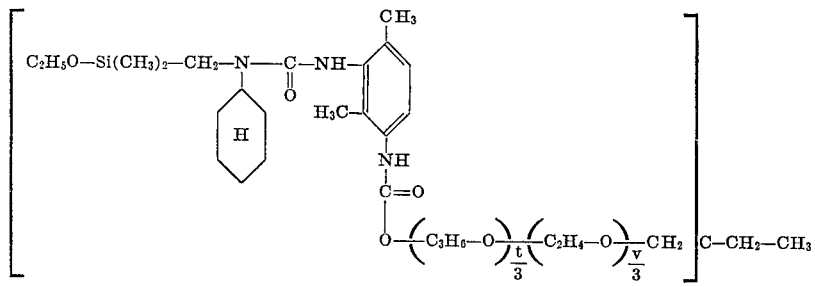

with $t$, on average, equal to 53 and $v$, on average, equal to 7.5.

EXAMPLE 5

27.9 g (0.1 gram equivalent) of an isocyanate-modified carbamic acid ester of the formula

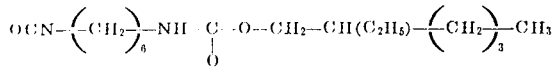

are gradually added to 32.5 g (0.1 mol) α-(butylamino)-benzyl-triethoxy-silane, while cooling with ice, the mixture is stirred for 30 minutes, and there is obtained a clear viscous, almost colorless liquid of a structure substantially corresponding to the formula

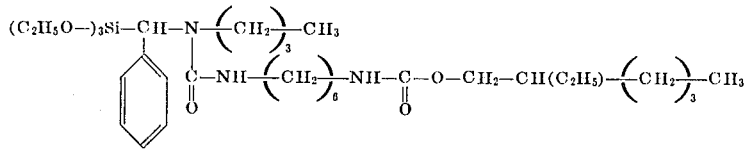

What we claim is:

1. Silyl-substituted urea derivatives of the general formula

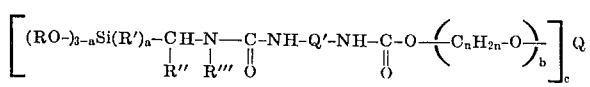

in which

R is selected from the group consisting of alkyl and cyclo-alkyl, having up to six carbon atoms, and phenyl, R' is a radical having up to 10 carbon atoms, selected from the group consisting of alkyl, cycloalkyl, aryl, halogenated alkyl, cycloalkyl and aryl, and cyano-substituted alkyl, cycloalkyl and aryl, R'' is selected from the group consisting of a hydrogen atom, a methyl radical and a phenyl radical, R''' is selected from the group consisting of a hydrogen atom and a radical having up to 10 carbon atoms, said radical being selected from the group consisting of alkyl, cycloalkyl, aryl, halogenated alkyl, cycloalkyl and aryl, and cyano-substituted alkyl, cycloalkyl and aryl, Q' is a bivalent hydrocarbon radical selected from the group consisting of alkylene having two to 10 carbon atoms, cycloalkylene, arylalkylene, arylene and alkylarylene, each of them having up to 10 carbon atoms, and arylene derived from diphenyl-methane by the removal of two hydrogen atoms, Q is a monovalent to hexavalent saturated aliphatic hydrocarbon radical having up to 6 carbon atoms, $a$ is selected from 0, 1, 2 and 3, $n$ is selected from 2, 3 and 4, $b$ is selected from 0 and the integers from 1 to 200, $c$ is the valency number of Q.

2. A compound according to claim 1, having the formula

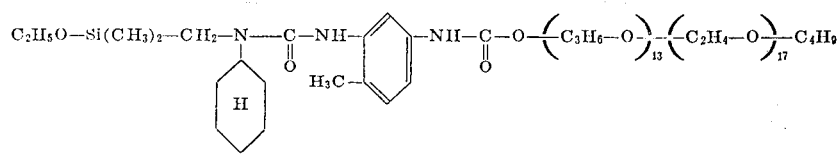

3. A compound according to claim 1, having the formula

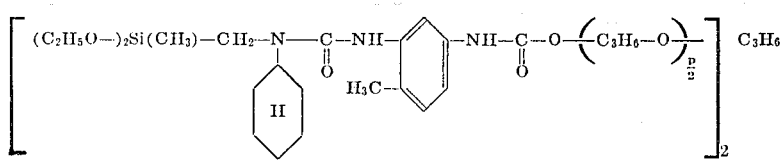

$p$ being, on average, equal to 28.4.

4. A compound according to claim 1, having the formula

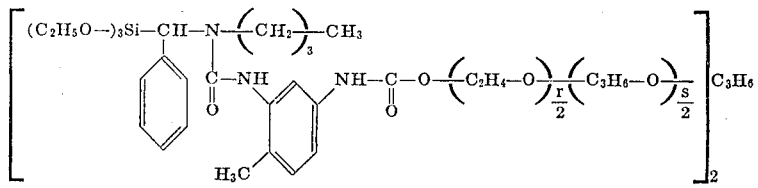

$r$ being, on average, equal to 11.6 and $s$ being, on average, equal to 59.8.

5. A compound according to claim 1, having the formula

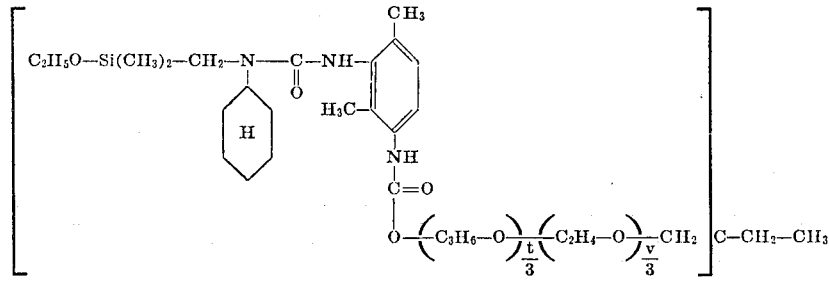

$t$ being, on average, equal to 53 and $v$ being, on average, equal to 7.5.

6. A compound according to claim 1, having the formula

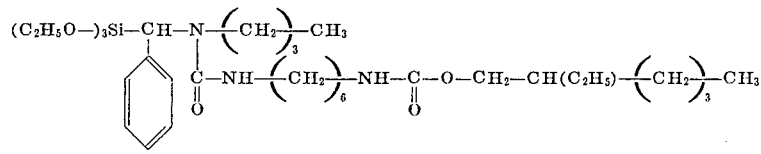

* * * * *

UNITED STATES PATENT OFFICE
CERTIFICATE OF CORRECTION

Patent No. 3,676,478      Dated July 11, 1972

Inventor(s) Hans Dietrich Golitz et al

It is certified that error appears in the above-identified patent and that said Letters Patent are hereby corrected as shown below:

Col. 5, line 66

"  C-CH$_2$-Cl$_3$ " should be

-- 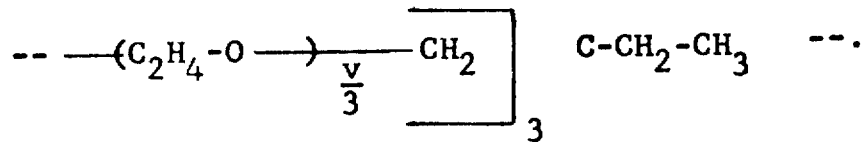 C-CH$_2$-CH$_3$ --.

UNITED STATES PATENT OFFICE
CERTIFICATE OF CORRECTION

Patent No. 3,676,478      Dated July 11, 1972

Inventor(s) Hans Dietrich Golitz et al

It is certified that error appears in the above-identified patent and that said Letters Patent are hereby corrected as shown below:

Col. 8, Claim No. 5

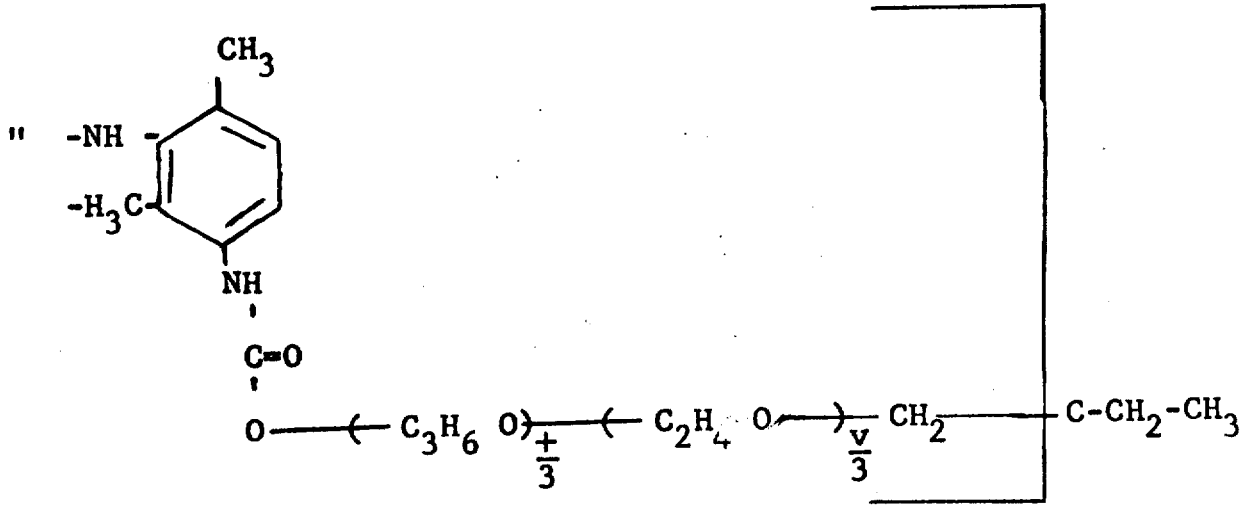

should be

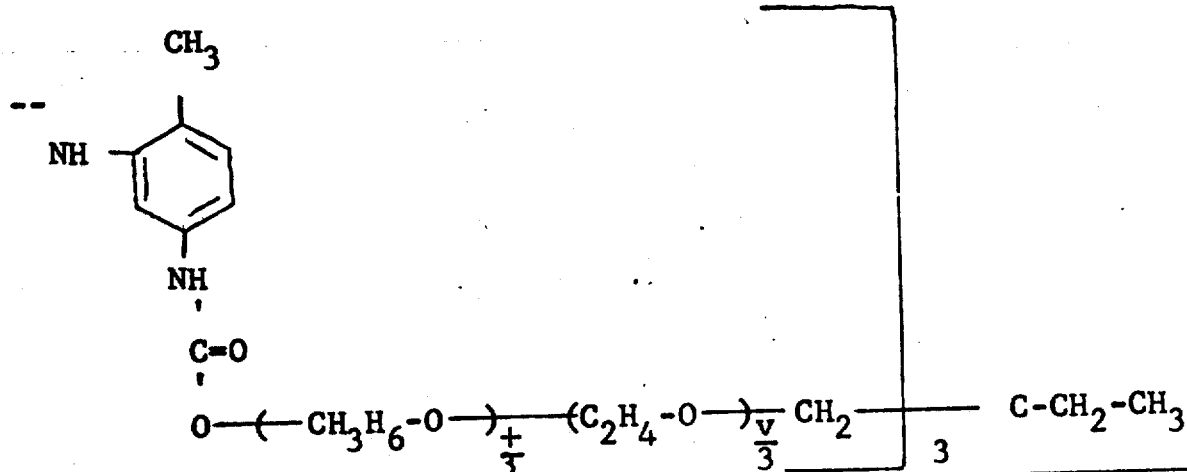

Signed and sealed this 6th day of March 1973.

(SEAL)
Attest:

EDWARD M. FLETCHER, JR.
Attesting Officer

ROBERT GOTTSCHALK
Commissioner of Patents